L. B. WILLIAMS.
AUTOMATIC ELECTRIC POWER AND LIGHT SYSTEM.
APPLICATION FILED FEB. 19, 1917.
1,403,216.  Patented Jan. 10, 1922.
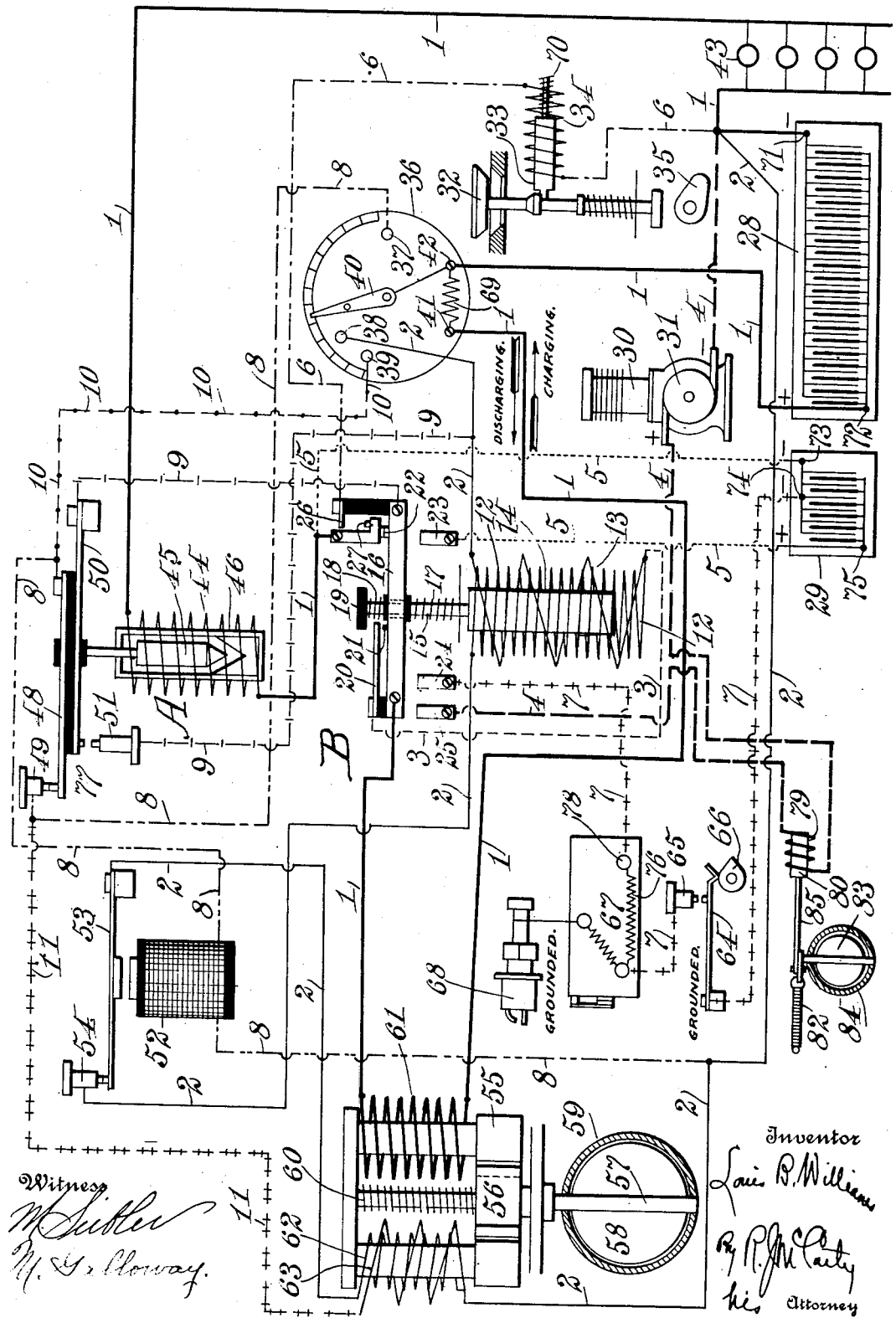

UNITED STATES PATENT OFFICE.

LOUIS B. WILLIAMS, OF DAYTON, OHIO.

AUTOMATIC ELECTRIC POWER AND LIGHT SYSTEM.

1,403,216.  Specification of Letters Patent.  Patented Jan. 10, 1922.

Application filed February 19, 1917. Serial No. 149,398.

*To all whom it may concern:*

Be it known that I, LOUIS B. WILLIAMS, citizen of the United States, residing at Dayton, in the county of Montgomery and State of Ohio, have invented certain new and useful Improvements in Automatic Electric Power and Light Systems; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an automatic electric power and light system which is especially adapted for use in isolated stations although of a broader scope of usefulness. The object thereof is primarily to provide a system of electric light and power that is available for farm and household uses and which is entirely automatic in its operation, and possesses the points of novelty and advantage hereinafter described and claimed. The present system of control automatically starts the engine, relieves the compression in the cylinder which insures easy and positive starting, primes the cylinder, supplies a flow of current through C. E. M. F. cells that they will have capacity to supply current for ignition, cuts out the compression release member at the proper time, allowing the charge in the cylinder to be compressed and fired, governs the speed of the engine and dynamo, thereby holding the line voltage constant under varying line loads, with the same E. M. F. as when the battery alone is supplying the line, charges the storage battery at a predetermined maximum rate, cuts down the charge rate at the proper time, indicates the state of charge or discharge of the battery, and stops the engine, all at the proper time.

In carrying out the objects and purposes of my invention, the following instrumentalities are employed and combined to obtain the desired results, to-wit, an internal combustion engine, a dynamo connected thereto, a storage battery containing active and C. E. M. F. cells, an electric throttle regulating device, an electrically controlled cylinder priming device, an ampere hour meter provided with means to open and close circuits, an electrically-controlled compression release device, a master switch, a stop relay, an ampere relay, a spark coil and a timer with electric conductors and circuits, as hereinafter described in connection with the accompanying diagrammatic illustration.

The internal combustion engine is a well known means for driving a dynamo, which converts mechanical energy into electrical energy, thereby supplying current that may be used for charging a storage battery and supplying current for light and power loads on a main line. Operating as a motor, as is well known, it changes electrical energy into mechanical energy and starts the internal combustion engine. The battery which consists of active cells and C. E. M. F. cells is employed for storing electricity that is utilized for light and power on the line, for furnishing ignition, for starting the internal combustion engine, and for operating the various devices. It is well known that when a battery is being charged, the voltage at its terminals rises above the normal voltage of the battery, therefore, the C. E. M. F. battery 29 is connected into the main line circuit when the master switch is in the running position and holds the voltage of the line circuit normal. The method of employing these C. E. M. F. cells for furnishing ignition current will be set forth hereinafter. The electric throttle regulating device is employed in the system to control the speed of the prime mover, i. e. the internal combustion engine and by this control I am enabled to hold the line voltage constant under varying loads, to change the rate of charge to the storage battery from a maximum to a minimum rate thereby charging the battery under most favorable conditions. This regulator coil, as hereinafter described, enables the engine to run slow when the load is light and to increase its speed automatically and develop more power when the line load is heavy. Should the engine be held at a maximum speed required to develop its full horse power, it would entail an unnecessary waste of energy when light loads are on the line. The regulating device contains three windings, to-wit, a series winding 61, a first shunt winding 62 and a second shunt winding 63, as shown in the accompanying diagrammatic drawing, and to be further referred to in a more complete description of the system. The regulator electromagnet holds three windings, 61, 62 and 63.

Coil 61 is a series coil and is in the starting generator circuit when the battery is supplying current for cranking the engine and in the battery charging circuit when the starting generator is being driven by the engine and charging the battery. It is therefore seen that there is a reversal of current through coil 61 depending on whether the battery is discharging into the starting generator or being charged by it. The shunt winding 62 is in series with coils 69 and 12 and is connected across the battery 28 and the terminals of generator 31. Coil 62 is so wound that it resists of "bucks" coil 61 when current is flowing to the starting generator 31 and assists coil 61 in attracting the armature 56, when current is flowing from the starting generator through coil 61 to the battery. When the armature 56 is attracted by the poles 55 the throttle valve 58 is closed more or less against the tension of the spring 60. When the poles 55 do not attract armature 56, the throttle valve 58 is held open by spring 60. The second shunt winding 63 when supplied with current through contact 37, aids the coils 61 and 62 in closing the throttle in order to maintain practically constant voltage on the line as against the tendency of varying line loads to change it. The armature 56 and throttle 58 are normally held in an open position by spring 60. The regulating device includes the armature 56 between the pole pieces 55, and the same is directly connected to the throttle valve 58 through a shaft 57, said valve being in the intake fuel pipe 59 of the engine 30. The series winding 61 is in series in the circuit including the dynamo 31, the ampere hour meter, and the battery at times when the internal combustion engine is running, which circuit is in parallel with the coil of ampere relay A and main line circuit; and is in series with the ampere hour meter, coil of ampere relay A and main line when said engine is not running. The ampere relay A has a dash pot control in both directions of movement.

The first winding, 62 is in series with coil 12 across the starting generator 31, when the master switch B is in running position and the engine is cranking, current flowing from positive terminal 72, through line 1 to post 42, through series winding 69 to post 41, through line 1 to series regulator winding 61, through line 1 to master switch arm 16, through master switch contact 21 to conductor 20, through line 3, through master switch winding 12, through line 2, to contact 54, through conductor spring 53, through line 2 to first shunt winding 62, thence through line 2 back to terminal 71 of battery 28. This current through the coil 62 magnetizes the poles of the regulator 55, with the opposite polarity from that set up by the coil 61, when current is flowing through 61 from the battery to the starting generator 31, therefore the armature 56 will not be attracted by the pole pieces 55 and as engine gains in speed the starting generator 31 instead of driving the engine is driven thereby and begins to charge the battery 28, causing a reversal of the current through the coil 61. The line wire 1 is connected in parallel with battery 28 and regulator winding 61 and any load on said line wire will tend to reduce the amount of charging current passing to the battery and the regulator circuit and will instantly cause the current in winding 61 to be weakened, thereby causing armature 56 and valve 58 to open and supply additional fuel to the internal combustion engine 30, thus generating sufficient power to take care of the main line load and prevent changes of lamp load from causing changes in generator terminal voltage. The armature 56 normally holds the valve 58 open through the action of spring 60 while the engine is being cranked. As soon as said engine gains speed and drives the dynamo at a sufficient speed to generate current, the current flowing through the winding 61 is reversed and the pole piece 55 will magnetically attract armature 56 and will hold the throttle valve 58 in a position to supply the proper amount of fuel to the engine to charge the battery at a predetermined maximum rate. As greater line loads are placed on the main line circuit, the throttle valve 58 will open and supply the necessary fuel to operate the internal combustion engine at the proper speed to supply said line load and hold the charging rate to the battery constant, until the battery voltage begins to rise.

The second shunt winding 63 comes into operation when the battery becomes fully charged and the arm 40 is in contact with point 37 while the ampere relay is in its actuated position, contact being made at 51 and broken at 49. When this condition exists, the arm 40 of the ampere hour meter will supply current through contact 37 to contact 49. As the ampere relay is in its actuated position, current cannot flow though conductor 48 to stop relay winding 52 but is shunted through line 11 and through shunt winding 63 of the regulator, thereby strengthening the action of series winding 61 and causing the armature 56 and the throttle valve 58 to be closed slightly more than its normal position while running, thus causing less fuel to be supplied to the engine and this will automatically cut down the battery charging rate.

In order to facilitate easy and positive starting of the internal combustion engine, I use a solenoid winding 79 in the dynamo circuit 4 which is in series with the main regulator winding 61. When current flows from the positive terminal of the battery through line 1 and through priming coil 79 to the positive terminal of the motor generator in order to crank the engine, an excess current flows momentarily to overcome static friction and this current is utilized to draw in the solenoid plunger 80 which closes a valve 83 through a link 85 against the action of spring 82. The valve 83 is placed in the air intake pipe 84 of the carbureter, and is normally held in an open position by spring 82. As current flows from the battery to the dynamo for starting the engine, the valve 83 is closed momentarily thereby enabling the piston of the engine on its downward stroke to draw a charge of pure gasoline into the cylinder thereby priming it. As the fly-wheel of the engine gains momentum, the current required to keep said engine cranking lessens materially and the action of spring 82 will withdraw the solenoid plunger 80 against the action of current flowing through winding 79 and allow the valve in air intake pipe 84 to assume its normal open position.

The ampere hour meter contains a special dial which has the permanent electrical contacts 37, 38 and 39 which are distinguished as full stop, start and stop contacts, respectively. These contacts close circuits as the arm 40 oscillates in clockwise or counter-clockwise directions depending upon the current flowing through said meter in a charging or discharging direction. As the meter is to indicate only the state of charge or discharge of the battery, it is connected in series with the battery by line 1. When the battery is fully charged, as indicated by the position of the arm 40, a circuit at 37 will be closed. When the battery is discharged to a predetermined point where it is desirable to start recharging the battery, a circuit at 38 will be closed by the position of the arm 40. Should the battery become discharged beyond the point 38, the arm 40 upon reaching contact 39 will close a circuit at 39. These circuits and their uses will be described more fully in detailing the various circuits that are closed.

Referring to the compression release device, the armature 33 is normally held, while the master switch is not in its running position, in a position against the stem of the exhaust valve 32 by a spring 70 and said valve is prevented from seating until the tension of said spring is overcome by the magnetism of winding 34. When this takes place, the armature 33 will be withdrawn from contact with the valve stem as soon as cam 35 on the engine cam shaft, by rotating, lifts the said valve and releases the pressure on said armature 33, at which time the valve will be permitted to perform its function of seating and holding compression in the engine cylinder. This mechanism insures easy starting of the engine as under no conditions will the battery be called upon to overcome static torque and compression in the engine cylinder at the same time.

The master switch controls the battery and line circuits when the said switch is in its normal position as shown in the drawing. It also controls the several circuits to the battery, dynamo, compression release, and ignition when the master switch armature 14 has been fully actuated by windings 12 and 13 which draw the said master switch arm 16 in contact with contacts 23, 24 and 25, and also closes a circuit between points 27 and 26. The armature stem 15 is insulated from the arm 16 as shown. Insulation also prevents currents grounding the master switch when armature 14 is actuated and closes contact between spring contact member 20 and arm 16 at 21. The spring 17 raises the master switch arm and holds it in position, as shown in the drawing, when the switch winding is not energized. Spring 18 is of less tension than spring 17 and the purpose thereof is to further lift the armature and carry the head 19 away from spring contact member 20 and permit the same to break contact at 21. This is after contact is made at 22 through the influence of spring 17, it being borne in mind that the armature stem 15 has free movement through the insulation in the switch arm 16.

The stop relay consists of an electromagnetic winding 52, a spring armature 53, and contact at 54. Its function is to break the master switch circuit when the arm 40 of the ampere hour meter makes contact and closes circuit at 37, providing the ampere relay contact 49 is closed, as shown in the drawing. The stop relay also is actuated and breaks the master switch circuit at point 54 when the arm 40 makes contact and closes a circuit at 39.

The winding 44 of the ampere relay is connected in series with the main line load 43 and is actuated when the load on the main line reaches a predetermined flow in amperes. When so actuated, it breaks contact at 49 and thereby prevents the engine from stopping when the arm 40 closes a circuit at 37, but shunts this current through regulator winding 63, as before mentioned. Also when the engine is at rest, the ampere relay, by closing a circuit at 51 through spring conductor 50, will actuate the master switch and start the engine. By breaking contact 49 and making contact 51 whenever the line load has reached a certain point, the engine will start and cannot stop unless the line load becomes so great that the dynamo and battery both are required to carry it. When this condition happens, the engine will stop when arm 40 makes contact at 39 and acts as a warning that the plant has been operated under too great load.

When the internal combustion engine 30, and motor generator 31 are at rest, as shown in the annexed diagram, and the various electrical devices are in their normal positions, the line 1 will supply line loads from battery 28. In supplying line loads, current flows from the positive terminal 72 of battery 28 to binding post 42, through series winding 69 to binding post 41 of the ampere hour meter (current flowing as described will cause the arm 40 of the ampere hour meter to move in a counter-clockwise or discharging direction). From binding post 41 the current flows through series winding 61 of the regulator, to the arm 16 of the master switch, through contacts 22 and 27, and thence through the ampere relay winding 44 to the line 1, and through line load 43 to the negative terminal 71 of the battery. The above is a complete description of the main line circuit when the internal combustion engine is at rest.

The automatic starting circuit for the internal combustion engine is through line 2. When the battery 28 is discharged to a predetermined point 38 and the arm 40 of the ampere hour meter makes contact therewith, current will flow from the positive terminal of the battery 28 to binding post 42, contact arm 40, contact point 38, resistance winding 13 and main winding 12 of the master switch, contact 54 and armature spring 53 of the stop relay, and through the first shunt winding 62 of the regulator device, and line 2 to the negative terminal 71 of the battery 28.

Since the current just described flows through the resistance winding 13 of the master switch, it will actuate the master switch armature 14 only far enough to make contact between the conductor 20 and the master switch arm 16 at the point 21. When this contact is made, current will flow through line 1, as before described, to the master switch arm 16, thence through contact 21, through conductor 20, through line 3, and through the main master switch winding 12, establishing a low resistance shunt around resistance winding 13 and causing sufficient current to flow to actuate the master switch armature 14 and arm 16 to their full extent, thereby breaking contact at 22 and making contacts at 23, 24 and 25, and between 27 and 26. The reason the current, flowing through the arm 40 and contact 38 and which primarily actuates the master switch armature 14 and makes contact between the master switch arm 16 and conductor 20 at contact 21, is sent through resistance winding 13 is that it is desirable to carry only small currents between the ampere hour meter arm 40 and its contacts as they are very slow in making and breaking and would probably cause a destructive arc to flow should these currents be of large amperage. Furthermore, when the generator 31 generates current for charging the battery, as hereinafter shown, the arm 40 will move in a clockwise direction and will open a circuit at 38 which would allow the master switch to go out in the non-running position if it were not held in by current flowing from the master switch through line 3 and coil 12, as described. When the master switch arm 16 is thus fully actuated, it closes a circuit between the arm 16 and the contact 25 and current will then flow from the positive terminal 72 of the battery 28 through line 1 to the master switch arm 16, contact 25, through line 4, to the positive terminal of the motor generator 31 (the latter operating as a motor in starting the internal combustion engine 30) through the negative terminal of the motor generator to the negative terminal 71 of the battery 28, thus completing the starting circuit.

Since the winding 44 of the ampere relay is in series with the main line load, currents flowing in the main line above a predetermined rate will tend to actuate the armature 45 of said ampere relay; therefore, when said predetermined load is carried on the line, the armature of the ampere relay will be withdrawn from contact 49 and will make a new contact at 51. When the new circuit at 51 is closed, current will flow from positive terminal 72 of battery 28, through line 1, post 42, series winding 69, post 41, through line 1, series regulator winding 61, line 1, master switch arm 16, through line 9 to spring conductor 50, through contact 51, through line 9, to resistance winding 13 of the master switch, through main winding 12 of master switch, through line 2 to negative terminals 71 of battery, as described in the master switch circuit above. As will be readily seen, this will actuate the armature 14 of the master switch and place the arm 16 thereof in the running position, so that the engine will start. By noting the above it will be seen that the engine will start when the battery becomes discharged to a predetermined point or when line load reaches a predetermined flow in amperes.

In supplying the main line with current from the battery while the internal combustion engine is being started, current is caused to flow through line 1 to master switch arm 16, contact 23, line 5, C. E. M. F. cells 29, line 5, and back to line 1, following line 1 through winding 44 of ampere relay, line load 43 to the negative terminal 71 of the battery 28, thus completing the main circuit from the battery while the internal combustion engine is being started. The line 6 supplies current to actuate the compression release device. In order to facilitate easy starting of the engine, especially in cold weather, and to avoid taking large injurious currents from the battery to overcome compression, I release the compression for at least part of one cycle by means of a plunger 33 which is adapted to hold the exhaust valve 32 of the engine off its seat through an engagement with the stem of said valve. The exhaust valve is so held until a cam 35 on the engine cam shaft elevates the valve sufficiently to release the engagement of the plunger 33 and the valve stem. This allows the solenoid winding 34 to retract the plunger 33 against the tension of a spring 70. The solenoid 34 is energized from the positive terminal 72 of the battery 28, through line 1 to master switch arm 16, through contact 23, line 5, C. E. M. F. cells 29, line 5, contacts 27 and 26, line 6, winding 34, to negative terminal 71 of the battery 28. This circuit, when closed, causes a current to flow through positive and negative terminals 75 and 73 of C. E. M. F. cells 29, giving said cells ampere capacity that they may be used to supply low voltage current for ignition purposes.

The ignition circuit is closed when the master switch is in the running position, as follows:—Current will flow from positive terminal 75 of the C. E. M. F. cells through line 5, contact 23, master switch arm 16, contact 24, through line 7 to terminal 78 of spark coil 67, through primary winding 76 of said coil, through line 7 to contact 65, through timer spring 64 which is acted upon by timing cam 66 in a well known manner, thence through line 7 to terminal 74 of C. E. M. F. cells 29. The distributor arm 64 is grounded, therefore, when cam 66 on the cam shaft of the engine closes circuit between 64 and 65 current will flow through the secondary winding of spark coil 67 to the spark plug 68 which is also grounded, and will ignite the charge at the proper time. When the master switch is in running position and the dynamo is generating current, the battery is charged and the main line load supplied through circuits, as follows:—In charging the battery 28, current will flow from the positive terminal of motor generator 31, through line 4 to contact 25, master switch arm 16, line 1, series regulator winding 61, continuing through line 1 to post 41 of ampere hour meter, through series winding 69 in the charging direction to post 42, through line 1 to positive terminal 72 of battery 28, through battery 28, to negative terminal 71, to negative terminal of motor generator 31, through line 4, thus completing the battery charging circuit. The line load is supplied from the motor generator and is in parallel with the battery charging circuit. The line current flows from motor generator 31 positive terminal through line 4, contact 25, master switch arm 16, contact 23, line 5, C. E. M. F. cells 29, continuing through line 5 to line 1, through ampere relay winding 44, through line 1, through load 43 to negative side of motor generator 31, through line 4, thus completing the main line circuit.

When the battery becomes fully charged as indicated by the ampere hour meter arm 40, and when the line load is not heavy enough to actuate the ampere relay, current will flow from motor generator 31, line 4, contact 25, arm 16, line 1, series regulator winding 61, post 41, series winding 69, arm 40, contact 37, line 8, contact 49, through conductor 48, through line 8 to stop relay winding 52, and through line 8 and back to negative terminal of motor generator 31, through lines 2 and 4. This circuit will attract spring armature 53 of the stop relay and break the master switch line at 54, therefore, the master switch will go out and the engine will come to rest.

When the battery is fully charged and there is a load on the line great enough to actuate the ampere relay, the current will flow as before stated as far as the contact 49. Since the circuit is broken at 49, by the ampere relay, current cannot flow through conductor 48 and actuate the stop relay but will flow through line 11 to shunt winding 63 of the regulator through lines 2 and 4 to the negative terminal of the motor generator, thus closing valve 58 slightly and cutting down charge rate to battery 28.

When the engine is not running and the battery 28 becomes discharged to a predetermined point, so that the arm 40 of ampere hour meter is in contact with contact point 39, current will flow from positive terminal 72 of the battery 28, through line 1 to post 42, through arm 40, contact 39, line 10 to line 8, through line 8, through stop relay winding 52, through lines 8 and 2 to the negative terminal 71 of battery 28. The arm 40 will only make contact at 39 when the engine 30 fails to start after contact at 38 has been made and the battery becomes discharged to the point 39 by the continuous cranking of said engine. The arm 40 will also make contact at 39 while the engine is running and bringing it to a stop when line loads in excess of the dynamo output are being carried for a considerable length of time requiring all of the dynamo output and some discharge from the battery to carry said line load. The engine will always come to rest when the circuit between the arm 40 and contact 39 is closed and will prevent the battery from becoming totally discharged through the continuous cranking of the engine when the engine fails to start through lack of fuel, and in the second case the engine will stop when the dynamo is being over-loaded and discharged from the battery is required to furnish part of said excess line load. When the engine stops from the above causes, lights on the line will dim and act as a warning that the plant has been operated under greater loads than that of the rated capacity of the plant.

The armature 45 of the ampere relay is tapered at its free end to obtain long action in its operation and to enable contact to be made at 51 through a slow action. Such action is desirable in cases where the internal combustion engine has come to rest through the arm 40 closing circuit at 37. The stem of the ampere relay armature 45 is insulated from the spring contact arms 48 and 50. When no load is on the line and, consequently, there is no discharge from the battery, the circuit at 37 will remain closed. However, should a large line load be thrown on and off the line suddenly, the ampere relay will have a tendency to be actuated for an instant causing the master switch to be drawn into its running position with the engine attempting to start. As the load mentioned is only momentary, the ampere relay would go out before the engine is under way and the circuit through the arm 40 and contact 37 could immediately break the master switch circuit, allowing said master switch to go out and break an excessive current at contact 25 (said current flow being occasioned by overcoming static torque in starting the engine) which would be apt to draw a destructive arc and damage or ruin the contact if allowed to exist. Since it is well known that in starting a motor on the main line greater current is required for a short period than is required for running the motor, I overcome defects as mentioned above and the danger of injuring contacts by submerging the armature 45 of the ampere relay in oil contained in the shell or core 46 and, by employing this dash-pot action in connection with the ampere relay, any momentary heavy load on the line will not actuate the ampere relay armature 77, therefore, the master switch will not be actuated and the engine will not start unless the load remains on the line for a predetermined length of time. Likewise, since the armature action of the ampere relay is thus dash-potted in both directions, the engine will have had an opportunity to get fully under way before there is a possibility of the master switch going out and, consequently, only normal current will be broken by the master switch arm.

The ignition current is supplied by allowing the current that passes through the winding 34 to also flow through the C. E. M. F. cells 29, thereby giving them ampere capacity which is ample for the ignition current.

Having described my invention, I claim:

1. In an automatic electric light and power system, as herein described, the combination of an internal combustion engine, a dynamo connected to the engine, a storage battery, a main line, an automatically controlled electric switch adapted to connect the main line with the battery when the switch is in a normal position, an ampere hour meter provided with means for making and breaking a circuit at a fixed point, and adapted to cause the actuation of said switch when said circuit is made, thereby making electrical connection between the motor generator and the battery.

2. In an automatic electric light and power system, the combination of an internal combustion engine, a compression release device, a dynamo connected to the engine, a storage battery including C. E. M. F. cells, a main line, an automatically controlled electric switch adapted to connect the main line to the battery when the said switch is in its normal position, electric means adapted to actuate said switch to connect the dynamo with the battery in starting the engine and to send current through said compression release device to actuate said device and allow compression to take place in the engine cylinder, said current passing through the C. E. M. F. cells thereby giving said cells ampere capacity.

3. In an automatic electric light and power system, as herein described, the combination of an internal combustion engine, a compression release device, a dynamo connected to the engine, a storage battery including C. E. M. F. cells, ignition devices, a main line, an automatically controlled electric switch adapted to connect the main line to the battery when the switch is in its normal position, electric means adapted to actuate said switch to connect the dynamo with the battery in starting the engine and to send current through the compression release device to actuate said device and allow compression to take place in the engine cylinder, said current passing through the C. E. M. F. cells thereby giving said cells ampere capacity, and to close the ignition circuit and supplying current to the line while the engine is starting.

4. In an automatic electric light and power system, as herein described, the combination of an internal combustion engine, a dynamo driven thereby, a storage battery, a main line, an automatically controlled electric switch adapted to connect the main line with the battery when in a normal position, electrical means for actuating said switch to connect the dynamo with the battery in starting the engine, an electro-magnetic regulator including a throttle valve and series and multiple shunt windings, an ampere hour meter, an ampere relay, electrical connections between the ampere hour meter and one of the shunt windings of the regulator when the ampere relay is in its actuated position whereby additional current through said shunt winding will assist the series winding of the regulator in slightly closing the throttle valve of the engine to check the speed of the engine and decrease the output of the motor generator by cutting down the charge rate to the battery to a predetermined point.

5. In an automatic electric light and power system, as herein described, the combination of an internal combustion engine, a dynamo connected thereto, a storage battery, a valve controlling the admission of fuel to said engine, an ampere hour meter, an ampere relay, a regulator controlling said valve and consisting of an electro-magnet, one of the pole pieces of which has a winding in series with the motor generator and the battery-charging circuit, which circuit is in parallel with the dynamo and the main line circuit, and the other of which pole pieces has two shunt windings, one of which shunt windings is shunted across the terminals of said storage battery and tends to give polarity to the armature of said regulator and to neutralize the effect of tension on said armature, the second shunt winding being adapted to be brought into play through circuits made by the ampere hour meter and the ampere relay and to assist the series winding of the regulator in closing said valve and in cutting down the dynamo output so that the battery charging rate is reduced to a predetermined point.

6. In an automatic electric light and power system, as herein described, the combination of an internal combustion engine, a dynamo connected thereto, a main line, a throttle valve controlling the admission of fuel to said engine, an electro-magnetic regulator containing a series winding controlling said valve, a battery in series with the dynamo and regulator, a line circuit in parallel with the dynamo and regulator, an ampere hour meter in series with the regulator series winding and battery-charging circuit, and an ampere relay in series with the main line and which when actuated breaks a circuit from the ampere hour meter and thereby prevents the engine from stopping when the battery is fully charged.

7. In an automatic electric light and power system, as herein described, the combination of an internal combustion engine, a dynamo connected thereto, a battery, a battery-charging circuit, a throttle valve controlling the admission of fuel to said engine, an electro-magnetic regulator controlling said valve and having series and shunt windings, a battery in series with said dynamo and regulator, a line circuit in parallel with the dynamo and the regulator, an ampere hour meter in series with the regulator series winding and battery-charging circuit, an ampere hour meter, and an ampere relay in series with the main line and which when said relay is actuated will break a circuit from the ampere hour meter and thereby prevent the engine from stopping when the battery is fully charged, and allow a current to flow through one of the shunt windings of the regulator when the battery becomes fully charged thus cutting down the charging rate to the battery to a predetermined rate.

8. In an automatic electric light and power system, as herein described, the combination of an internal combustion engine, a dynamo, a main line, a storage battery, a valve controlling the admission of fuel to said engine, an ampere hour meter, an ampere relay, a master switch containing a resistance winding and a main winding, means for actuating said master switch primarily through the resistance winding to automatically cut out said resistance winding when slightly actuated thereby sending current through the main winding alone and whereby said switch is electrically self-sealing.

9. In an automatic electric light and power system, the combination of an internal combustion engine, a dynamo connected thereto, a storage battery, a valve controlling the admission of fuel to said engine, an ampere hour meter, an ampere relay, a regulator, a master switch containing a resistance winding and a main winding, said ampere hour meter including means for opening and closing circuits, said ampere relay including means for opening and closing circuits whereby the master switch is primarily actuated through the resistance winding, automatic electrical means for actuating said switch to its running position and holding it in such position, whereby the master switch circuit will not be broken when the primary circuits as closed by the ampere hour meter and ampere relay are subsequently opened.

10. In an automatic electric light and power system, the combination of an internal combustion engine, a dynamo connected thereto, a storage battery, a valve controlling the admission of fuel to said engine, a main line load, an ampere relay in series therewith, means for retarding action of the ampere relay in both directions of its movements whereby momentary heavy loads on the line will not actuate said ampere relay.

11. In an automatic electric light and power system, the combination of an internal combustion engine, a dynamo connected thereto, a storage battery, a valve controlling the admission of fuel to said engine, an ampere relay in series with the main line, an engine starting circuit, means for cushioning the movement of the ampere relay to allow the engine to reach a running condition before the master switch circuit can be broken thereby preventing excess currents from being broken when the master switch goes to its normal position.

12. In an automatic electric light and power system as herein described, the combination of an internal combustion engine, a dynamo connected thereto, a storage battery containing active and C. E. M. F. cells, an electrical compression release device, automatic controlling means comprising switching means adapted to connect the active cells to an external line circuit when the engine and dynamo are at rest, and automatic electrical means for actuating said switch to connect the active cells to the dynamo for starting the engine and to complete a circuit through the electrical compression release device, thereby actuating said device after static torque of the engine has been overcome, the current flowing through said circuit passing through the C. E. M. F. cells and giving said cells ampere capacity that they may be used to supply low voltage current for ignition purposes.

13. In an automatic electric light and power system as herein described, the combination of an internal combustion engine, a dynamo connected thereto, a storage battery containing active and C. E. M. F. cells, a compression release device, automatic controlling means comprising switching means adapted to connect the active cells to an external line circuit when the engine and dynamo are at rest, and automatic electrical means for actuating said switch to connect the active cells to the dynamo for starting the engine, and to complete a circuit through the electrical compression release device for actuating said device, said current passing through the C. E. M. F. cells to give them ampere capacity, and to close a low voltage ignition circuit, ignition current being supplied by the said C. E. M. F. cells.

14. In an automatic electric light and power system as herein described, the combination of an internal combustion engine, a dynamo connected thereto, a storage battery containing active and C. E. M. F. cells, an electrical compression release device, automatic controlling means comprising switching means adapted to connect the active cells to an external line circuit when the engine and dynamo are at rest, and automatic electrical means for actuating said switch to connect the active cells to the dynamo for starting the engine and to complete a circuit through the electrical compression release device for actuating said device, whereby current passes through the C. E. M. F. cells and gives them ampere capacity to supply low voltage current for ignition, closes an ignition circuit for the engine, connects the external line circuit to the active cells through the C. E. M. F. cells while the engine is cranking thereby reducing the voltage in the external circuit and by dimming the lights in said external circuit shows that the engine is cranking.

In testimony whereof I affix my signature, in presence of a witness.

LOUIS B. WILLIAMS.

Witness:
MATTHEW SIEBLER.